(12) United States Patent
Kimura

(10) Patent No.: US 11,226,012 B2
(45) Date of Patent: Jan. 18, 2022

(54) DRIVING FORCE TRANSMISSION DEVICE

(71) Applicant: JTEKT CORPORATION, Osaka (JP)

(72) Inventor: Takao Kimura, Miyoshi (JP)

(73) Assignee: JTEKT CORPORATION, Osaka (JP)

( * ) Notice: Subject to any disclaimer, the term of this patent is extended or adjusted under 35 U.S.C. 154(b) by 32 days.

(21) Appl. No.: 16/819,520

(22) Filed: Mar. 16, 2020

(65) Prior Publication Data

US 2020/0309199 A1    Oct. 1, 2020

(30) Foreign Application Priority Data

Mar. 26, 2019   (JP) .............................. JP2019-058463

(51) Int. Cl.
| | |
|---|---|
| *F16D 13/58* | (2006.01) |
| *F16H 48/40* | (2012.01) |
| *F16C 3/02* | (2006.01) |
| *F16D 13/52* | (2006.01) |

(52) U.S. Cl.
CPC ............... *F16D 13/58* (2013.01); *F16C 3/02* (2013.01); *F16D 13/52* (2013.01); *F16C 2326/01* (2013.01); *F16D 2300/26* (2013.01); *F16H 48/40* (2013.01)

(58) Field of Classification Search
CPC .......................................... F16D 13/52–13/58
See application file for complete search history.

(56) References Cited

U.S. PATENT DOCUMENTS

| | | | |
|---|---|---|---|
| 8,276,724 B2* | 10/2012 | Kim | F16D 27/115 |
| | | | 192/35 |
| 2005/0020396 A1 | 1/2005 | Kushino et al. | |
| 2009/0014271 A1* | 1/2009 | Matsumoto | F16C 35/073 |
| | | | 192/84.1 |
| 2016/0223025 A1* | 8/2016 | Vergara | F16D 1/06 |
| 2016/0238107 A1* | 8/2016 | Hirota | F16D 28/00 |
| 2017/0009817 A1* | 1/2017 | Ohno | F16D 13/648 |

FOREIGN PATENT DOCUMENTS

| | | |
|---|---|---|
| JP | 2004-332758 A | 11/2004 |
| JP | 2011-144858 A | 7/2011 |

* cited by examiner

*Primary Examiner* — Ernesto A Suarez
*Assistant Examiner* — Lillian T Nguyen
(74) *Attorney, Agent, or Firm* — Oblon, McClelland, Maier & Neustadt, L.L.P.

(57) ABSTRACT

A driving force transmission device includes a clutch housing configured to be connected to a propeller shaft; a shaft including a weakened portion that is a portion in an axial direction of the shaft; a multi-plate clutch disposed between the clutch housing and the shaft; a case member including a housing portion having a cylindrical shape, the housing portion being configured to house at least a part of the clutch housing; and a falling-off preventing member configured to, when the shaft is broken at the weakened portion, allow rotation of the clutch housing while restraining the clutch housing from falling off the housing portion.

6 Claims, 4 Drawing Sheets

DRIVING FORCE TRANSMISSION DEVICE

CROSS-REFERENCE TO RELATED APPLICATION

This application claims priority to Japanese Patent Application No. 2019-058463 filed on Mar. 26, 2019, incorporated herein by reference in its entirety.

BACKGROUND

1. Technical Field

The disclosure relates to a driving force transmission device that transmits a driving force of a vehicle.

2. Description of Related Art

Hitherto, a four-wheel drive vehicle, for example, having front wheels as main drive wheels and rear wheels as auxiliary drive wheels is equipped with a driving force transmission device that can adjust a driving force to be transmitted to the rear wheels according to the vehicle state. Such a driving force transmission device is disposed between a propeller shaft and a rear wheel differential device and transmits a driving force from the propeller shaft to the rear wheel differential device. A driving force transmission device described in each of Japanese Unexamined Patent Application Publication No. 2011-144858 (JP 2011-144858 A) and Japanese Unexamined Patent Application Publication No. 2004-332758 (JP 2004-332758 A) includes a clutch housing connected to a propeller shaft, a pinion gear shaft configured to output a driving force to a differential device, a multi-plate clutch disposed between the clutch housing and the pinion gear shaft, and a pressing mechanism configured to press the multi-plate clutch.

In the driving force transmission device described in each of JP 2011-144858 A and JP 2004-332758 A, the clutch housing is housed in a case member that is non-rotationally attached to a vehicle body. In the driving force transmission device described in JP 2011-144858 A, the clutch housing (outer rotary member) is partially housed in the case member (casing) and partially exposed from the case member. The clutch housing is supported on the pinion gear shaft via a bearing. In the driving force transmission device described in JP 2004-332758 A, the case member (clutch case) surrounds the outer periphery of and a front end portion of the clutch housing (housing) in the vehicle front-rear direction, and the clutch housing is supported by the case member via a bearing.

SUMMARY

In the driving force transmission device described in JP 2011-144858 A, when the propeller shaft collides with, for example, an obstacle on a road surface while a vehicle is traveling, and thus, breakage of the propeller shaft or the pinion gear shaft occurs due to the impact of the collision, there is a possibility that the clutch housing may fall off the case member. On the other hand, in the driving force transmission device described in JP 2004-332758 A, since the case member surrounds the clutch housing, even when the propeller shaft or the pinion gear shaft is broken, the clutch housing does not fall off the case member. However, the structure of the case member is complicated. Further, since the bearing is disposed between the case member and the clutch housing, the cost increases.

Therefore, the disclosure provides a driving force transmission device that can prevent a clutch housing from falling off a case member while reducing the cost.

One aspect of the disclosure relates to a driving force transmission device. The driving force transmission device includes a clutch housing configured to be connected to a propeller shaft; a shaft including a weakened portion that is a portion in an axial direction of the shaft; a multi-plate clutch disposed between the clutch housing and the shaft; a case member including a housing portion having a cylindrical shape, the housing portion being configured to house at least a part of the clutch housing; and a falling-off preventing member configured to, when the shaft is broken at the weakened portion, allow rotation of the clutch housing while restraining the clutch housing from falling off the housing portion.

With the driving force transmission device according to the above-described aspect of the disclosure, it is possible to prevent the clutch housing from falling off the case member while reducing the cost.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the disclosure will be described with reference to FIGS. 1 to 4. The technical scope of the disclosure is not limited to the embodiment.

Figure 1:
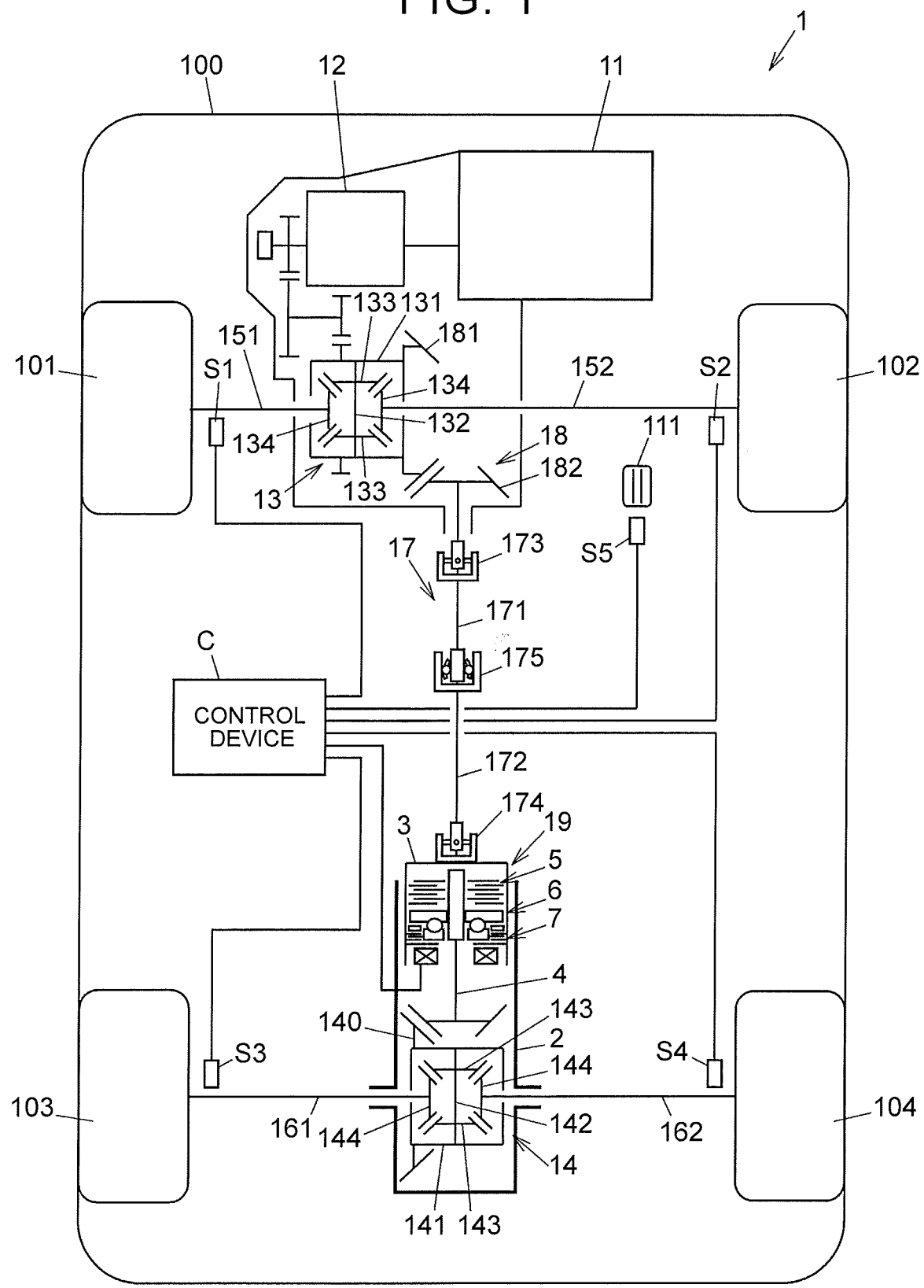
FIG. 1 is a schematic configuration diagram illustrating a schematic configuration example of a four-wheel drive vehicle equipped with a driving force transmission device according to an embodiment of the disclosure.

FIG. 1 is a schematic configuration diagram illustrating a schematic configuration example of a four-wheel drive vehicle 1 equipped with a driving force transmission device 19 according to the embodiment of the disclosure. The four-wheel drive vehicle 1 includes right and left front wheels 102, 101 as main drive wheels and right and left rear wheels 104, 103 as auxiliary drive wheels. A driving force of a drive source 11 is changed, i.e., a rotational speed of the drive source 11 is changed by a transmission 12, and then is constantly transmitted to the front wheels 102, 101 and is also transmitted to the rear wheels 104, 103 according to the vehicle state. The drive source 11 is, for example, an engine, but may alternatively be an electric motor or a combination of an engine and an electric motor.

The four-wheel drive vehicle 1 includes a driving force transmission system that transmits the driving force of the drive source 11 to the right and left front wheels 102, 101 and the right and left rear wheels 104, 103 after the rotational speed of the drive source 11 is changed by the transmission 12. The driving force transmission system includes a front differential 13, a rear differential 14, right and left front wheel drive shafts 152, 151 disposed between the front differential 13 and the right and left front wheels 102, 101, right and left rear wheel drive shafts 162, 161 disposed between the rear differential 14 and the right and left rear wheels 104, 103, a propeller shaft 17 that transmits the driving force in the vehicle front-rear direction, a gear mechanism 18 disposed between the front differential 13 and the propeller shaft 17, and the driving force transmission device 19 disposed between the propeller shaft 17 and the rear differential 14.

The front differential 13 includes a front differential case 131, a pinion pin 132 fixed to the front differential case 131, a pair of pinion gears 133 supported on the pinion pin 132, and a pair of side gears 134 meshing with the pinion gears 133. The right and left front wheel drive shafts 152, 151 are respectively fixed to the side gears 134. The driving force of the drive source 11 is transmitted from the transmission 12 to the front differential case 131. The gear mechanism 18 includes a ring gear 181 fixed to the front differential case 131, and a pinion gear 182 meshing with the ring gear 181.

The propeller shaft 17 includes a front shaft portion 171, a rear shaft portion 172, a front universal joint 173 connecting the front shaft portion 171 and the pinion gear 182 of the gear mechanism 18, a rear universal joint 174 connecting the rear shaft portion 172 and a clutch housing 3 (described later) of the driving force transmission device 19, and a sliding type constant velocity joint 175 connecting the front shaft portion 171 and the rear shaft portion 172.

The rear differential 14 includes a rear differential case 141, a pinion pin 142 fixed to the rear differential case 141, a pair of pinion gears 143 supported on the pinion pin 142, and a pair of side gears 144 meshing with the pinion gears 143. The right and left rear wheel drive shafts 162, 161 are respectively fixed to the side gears 144.

The driving force transmission device 19 is controlled by a control device C and capable of adjusting the driving force that is transmitted from the propeller shaft 17 to the rear differential 14, according to the vehicle state. The control device C acquires detection values of rotational speed sensors S2, S1, S4, S3 that respectively detect rotational speeds of the right and left front wheels 102, 101 and the right and left rear wheels 104, 103, and a detection value of an accelerator pedal sensor S5 that detects a depression amount of an accelerator pedal 111, and controls the driving force transmission device 19 based on the detection values of the sensors S1 to S5 and so on.

Figure 2:
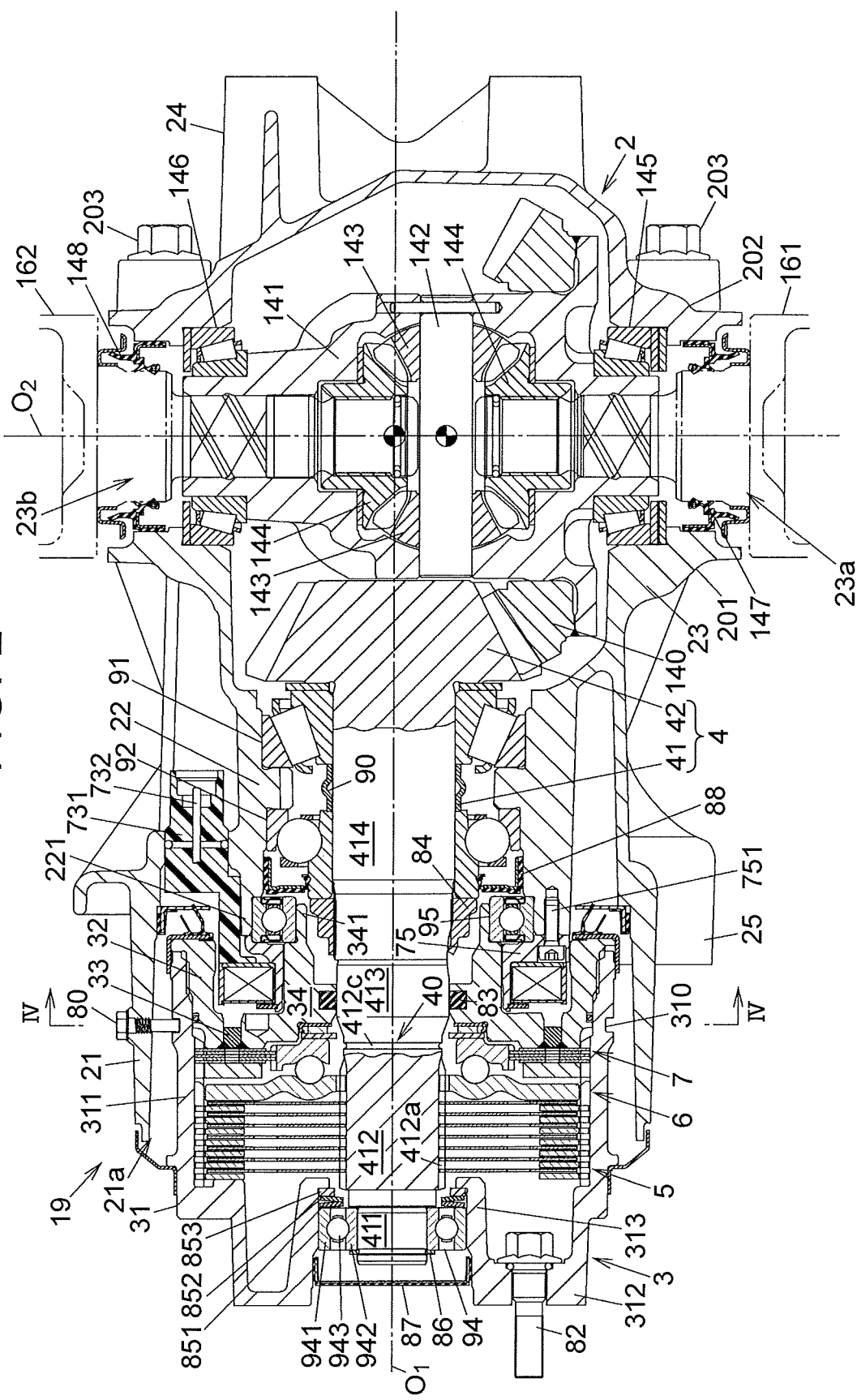
FIG. 2 is a sectional view illustrating the driving force transmission device and a rear differential.
Figure 3A:
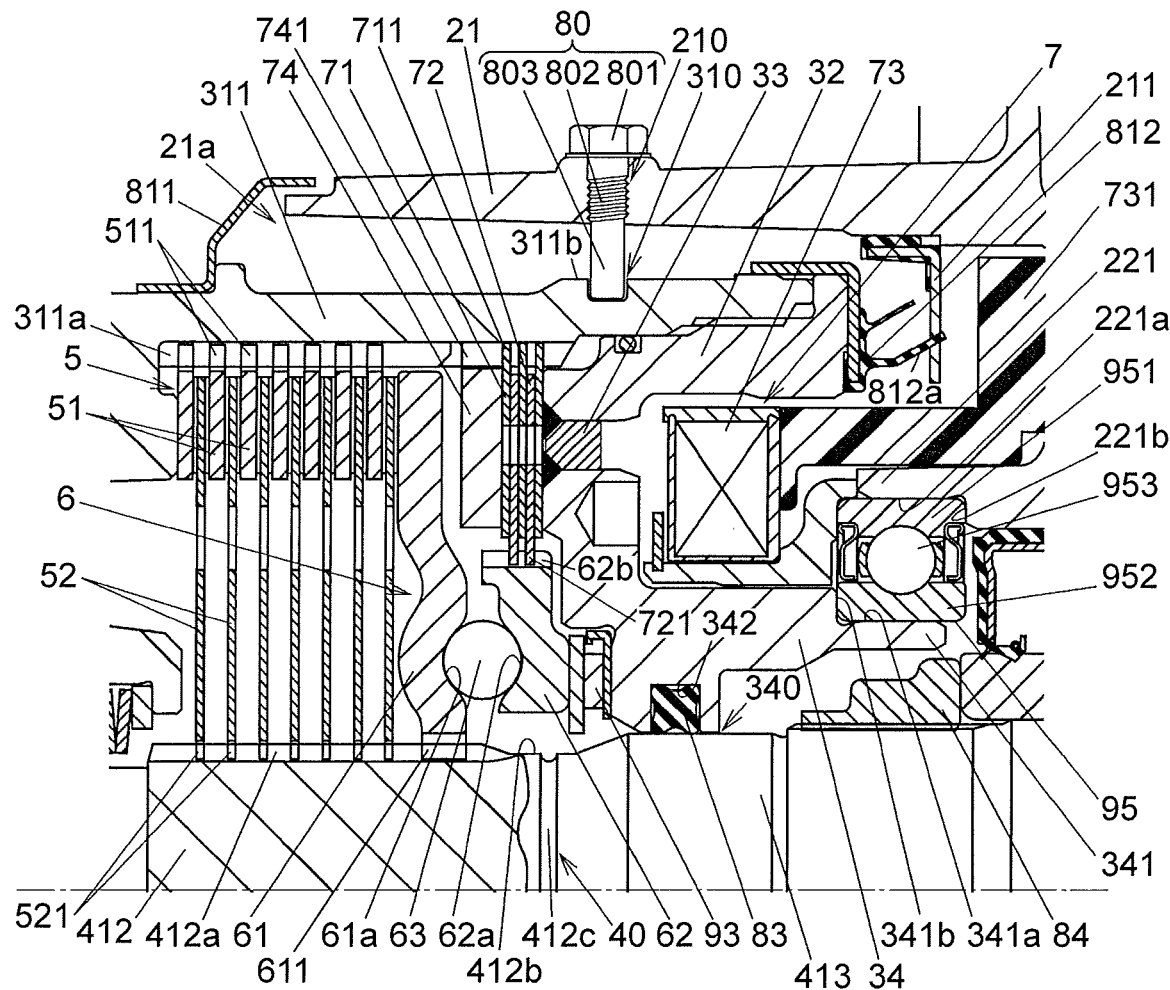
FIG. 3A is a sectional view illustrating a part of the driving force transmission device.
Figure 3B:
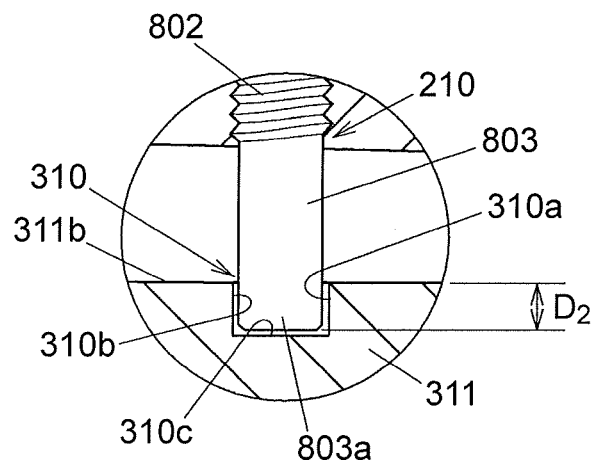
FIGS. 3B and 3C are partially enlarged views of FIG. 3A.
Figure 3C:
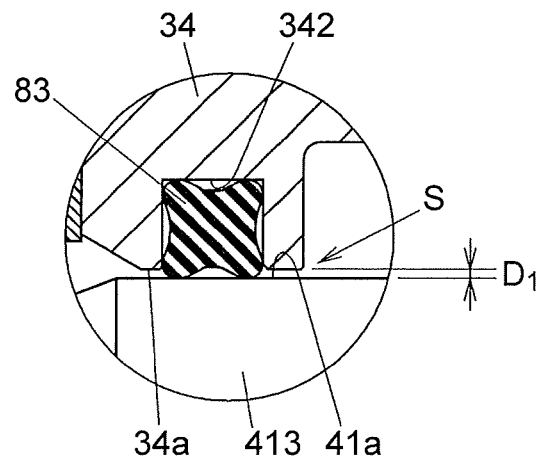
Figure 4:
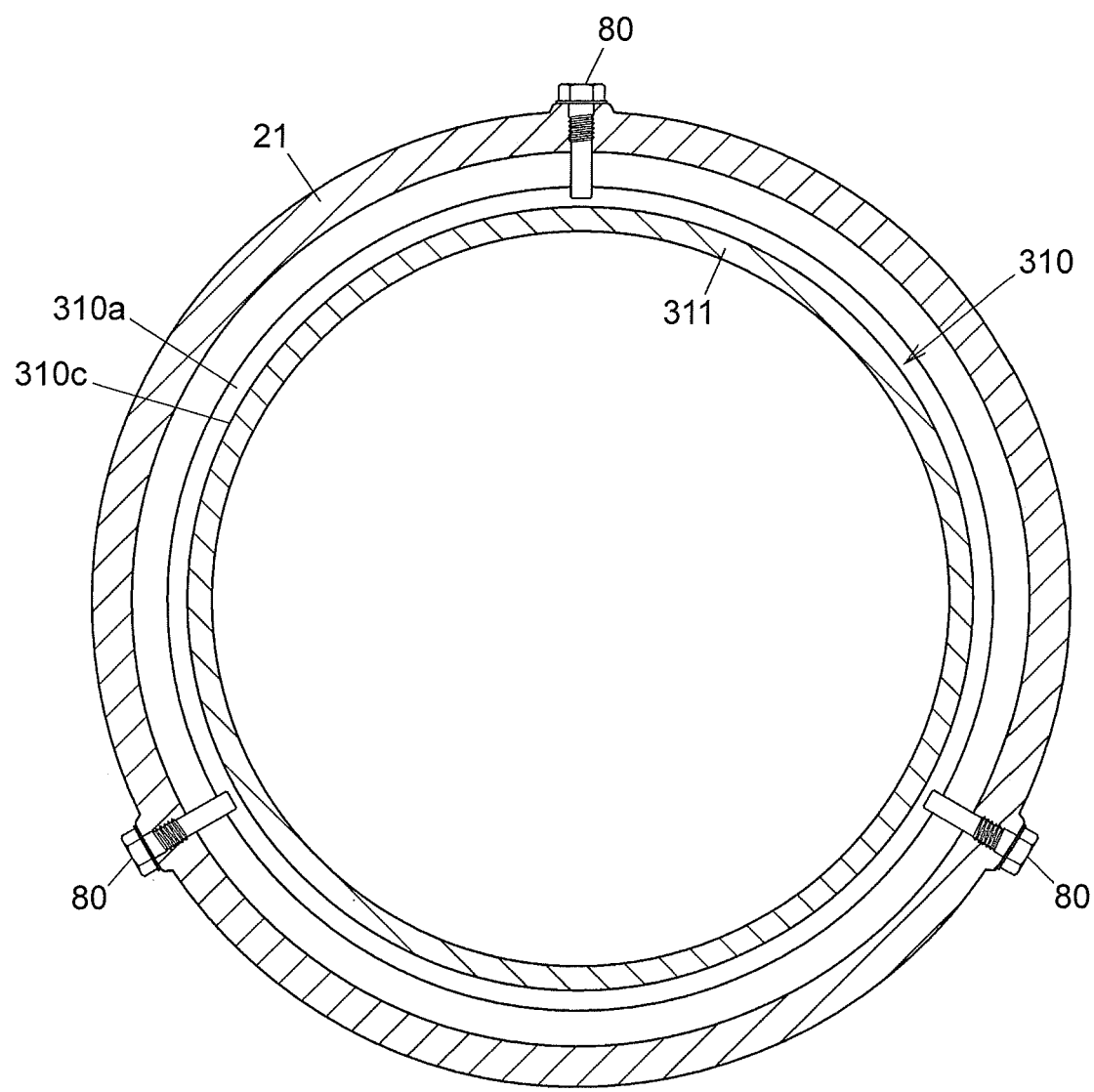
FIG. 4 is a cross-sectional view of a differential carrier and a clutch housing taken along the line IV-IV in FIG. 2.

FIG. 2 is a sectional view illustrating the driving force transmission device 19 and the rear differential 14. FIG. 3A is a sectional view illustrating a part of the driving force transmission device 19, and FIGS. 3B and 3C are partially enlarged views of FIG. 3A. FIG. 4 is a cross-sectional view of a differential carrier 2 and the clutch housing 3 taken along the line IV-IV in FIG. 2.

The driving force transmission device 19 includes the differential carrier 2 as a case member, the clutch housing 3 connected to the propeller shaft 17, a pinion gear shaft 4 disposed coaxially with the clutch housing 3, a main clutch 5 disposed between the clutch housing 3 and the pinion gear shaft 4, a cam mechanism 6 that generates a thrust force for pressing the main clutch 5, an electromagnetic clutch mechanism 7 that operates the cam mechanism 6, and a plurality of bolts 80 as a falling-off preventing member attached to the differential carrier 2. The clutch housing 3 and the pinion gear shaft 4 are rotatable relative to each other about a rotational axis $O_1$ extending in the vehicle front-rear direction.

The pinion gear shaft 4 includes a columnar shaft portion 41 and a gear portion 42 that is integral with the shaft portion 41 and greater in diameter than the shaft portion 41. A part of the shaft portion 41 is disposed in the clutch housing 3. The gear portion 42 is in mesh with a ring gear 140 that is fixed to the rear differential case 141 by welding. The rear differential case 141 is supported by the differential carrier 2 via a pair of tapered roller bearings 145, 146 and rotated about a rotational axis $O_2$ extending in the vehicle width direction by the driving force transmitted from the pinion gear shaft 4 to the ring gear 140. The gear portion 42 of the pinion gear shaft 4 and the ring gear 140 form a hypoid gear pair. The pinion gear shaft 4 is an example of a shaft of the disclosure.

The differential carrier 2 is formed by fastening together a body 201 on the front side in the vehicle front-rear direction and a lid member 202 on the rear side in the vehicle front-rear direction by a plurality of bolts 203 and is non-rotationally supported relative to a vehicle body 100 (see FIG. 1) by non-illustrated support members. The differential carrier 2 includes a cylindrical first housing portion 21 that houses the clutch housing 3, a second housing portion 22 that houses the pinion gear shaft 4 protruding rearward from the clutch housing 3 in the vehicle front-rear direction, a third housing portion 23 that houses the rear differential 14, and flange portions 24, 25 to which the support members for attaching the differential carrier 2 to the vehicle body 100 are fastened. The first housing portion 21 and the second housing portion 22 are formed by the body 201, and the third housing portion 23 is formed by the joining of the body 201 and the lid member 202.

The third housing portion 23 is provided with an insertion hole 23a through which the drive shaft 161 is inserted, and an insertion hole 23b through which the drive shaft 162 is inserted. Sealing members 147, 148 are respectively attached to the insertion holes 23a, 23b. In FIG. 2, the drive shafts 161, 162 are indicated by virtual lines (alternate long and two short dashes lines). The third housing portion 23 is filled with differential oil.

The first housing portion 21 houses a part of the clutch housing 3 in its axial direction, and the clutch housing 3 partially protrudes from a front side opening 21a of the first housing portion 21. The front side opening 21a is an opening at the front side of the first housing portion 21 in the vehicle front-rear direction. The first housing portion 21 may be configured to extend forward in the vehicle front-rear direction to be longer than the clutch housing 3 (i.e., the first housing portion 21 may be configured to extend forward in the vehicle front-rear direction beyond the clutch housing 3) so as to house the entire outer peripheral side of the clutch housing 3 in its axial direction. That is, the first housing portion 21 houses at least a part of the clutch housing 3.

The opening diameter of a front end portion of the first housing portion 21 in the vehicle front-rear direction is set to be greater than the maximum outer diameter of the clutch housing 3 so that the clutch housing 3 can be placed into the first housing portion 21 through the opening 21a when assembling the driving force transmission device 19. As illustrated in FIG. 3A on an enlarged scale, a dust cover 811 is attached to the clutch housing 3 at a part protruding from the first housing portion 21 so as to close the opening 21a. A slinger 211 is attached to the inner side of the first housing portion 21, and a sealing lip 812a of a sealing member 812 attached to the clutch housing 3 is in elastic contact with the slinger 211.

The clutch housing 3 includes a bottomed cylindrical housing body 31 housing a part of the pinion gear shaft 4 and the main clutch 5, an outer magnetic member 32 engaged with the inner surface of a rear end portion of the housing body 31 in the vehicle front-rear direction, a non-magnetic ring 33 fixed to the inner side of the outer magnetic member 32 by welding, and an inner magnetic member 34 fixed to the inner side of the non-magnetic ring 33 by welding. The housing body 31 is made of a non-magnetic metal such as an aluminum alloy. The outer magnetic member 32 and the inner magnetic member 34 are made of a soft magnetic metal such as an iron-based metal. The non-magnetic ring 33 is made of a non-magnetic metal such as an austenitic stainless steel.

The housing body 31 includes, integrally, a cylindrical portion 311, an annular joint attaching portion 312 provided at a front end portion of the housing body 31 in the vehicle front-rear direction, and a cylindrical bearing fitting portion 313 provided on the inner side of the annular joint attaching portion 312. A plurality of spline projections 311a (see FIG. 3A) extending in the axial direction are provided on the inner peripheral surface of the cylindrical portion 311. A yoke member of the rear universal joint 174 is attached to the joint attaching portion 312 by a plurality of bolts 82. In FIG. 2, one of the bolts 82 is illustrated.

The inner magnetic member 34 extends rearward beyond the outer magnetic member 32 in the vehicle front-rear direction and is provided with a bearing fitting portion 341 at its distal end. The inner magnetic member 34 has a through-hole 340 at its center, and the shaft portion 41 of the pinion gear shaft 4 is inserted through the through-hole 340. The inner diameter of the through-hole 340 is slightly greater than the outer diameter of the shaft portion 41 in the through-hole 340. As illustrated in FIG. 3C, the inner magnetic member 34 has, at a part of the inner surface defining the through-hole 340, a facing surface 34a that faces an outer peripheral surface 41a of the shaft portion 41 of the pinion gear shaft 4 such that a slight gap S is provided between the facing surface 34a and the outer peripheral surface 41a of the shaft portion 41. A dimension $D_1$ of the slight gap S in the radial direction of the shaft portion 41 is, for example, several hundred micrometers, and specifically, equal to or greater than 100 μm and less than 1 mm.

The inner magnetic member 34 is provided with a receiving groove 342 that is open at the facing surface 34a and receives an X-ring 83 formed by an elastic body and serving as a sealing member. The X-ring 83 partially protrudes from the receiving groove 342 so as to be in elastic contact with the outer peripheral surface 41a of the shaft portion 41, thereby preventing leakage of a lubricant filled in the clutch housing 3. Instead of the X-ring 83, an annular sealing member having another shape may be used.

The shaft portion 41 of the pinion gear shaft 4 includes, integrally, a boss portion 411, a small-diameter portion 412, a medium-diameter portion 413, and a large-diameter portion 414 that are arranged in this order from the vehicle front side. The outer diameters of the boss portion 411, the small-diameter portion 412, the medium-diameter portion 413 and the large-diameter portion 414 increase stepwise in this order. The X-ring 83 is in elastic contact with the medium-diameter portion 413. The small-diameter portion 412 between the medium-diameter portion 413 and the boss portion 411 is provided, at its part on the side of the boss portion 411, with a plurality of spline projections 412a extending in the axial direction. An annular groove 412c extending in the circumferential direction of the shaft portion 41 is formed in an outer peripheral surface 412b of the small-diameter portion 412. The outer peripheral surface 412b is located closer to the medium-diameter portion 413 than the spline projections 412a are (i.e., the outer peripheral surface 412b is located closer to the medium-diameter portion 413 than the portion where the spline projections 412a are formed is) in the axial direction of the shaft portion 41. The portion where the annular groove 412c is formed serves as a weakened portion 40 in the pinion gear shaft 4.

Between the inner peripheral surface of the second housing portion 22 of the differential carrier 2 and the outer peripheral surface of the large-diameter portion 414 of the pinion gear shaft 4, a pair of rolling bearings 91, 92 is disposed. The rolling bearings 91, 92 are arranged in the axial direction. In this embodiment, with regard to the rolling bearings 91, 92, the rolling bearing 91 on the gear portion 42-side (i.e., the rolling bearing 91 close to the gear portion 42) is a tapered roller bearing, and the rolling bearing 92 on the medium-diameter portion 413-side (i.e., the rolling bearing 92 close to the medium-diameter portion 413) is an angular contact ball bearing. A spacer 90 is disposed between the rolling bearings 91, 92. In the state where the rolling bearings 91, 92 are pressurized by a nut 84, the rolling bearings 91, 92 support the pinion gear shaft 4 such that the pinion gear shaft 4 is rotatable relative to the differential carrier 2. The second housing portion 22 is provided with a bearing fitting portion 221 at a position radially outward of the bearing fitting portion 341 of the inner magnetic member 34.

The main clutch 5 includes a plurality of main outer clutch plates 51 that are axially movable and non-rotatable relative to the clutch housing 3, and a plurality of main inner clutch plates 52 that are axially movable and non-rotatable relative to the pinion gear shaft 4. The main outer clutch plates 51 and the main inner clutch plates 52 are disposed alternately in the axial direction. Each of the main outer clutch plates 51 includes, at its outer peripheral end, a plurality of engaging projections 511 that are engaged with the spline projections 311a of the housing body 31. Each of the main inner clutch plates 52 includes, at its inner peripheral end, a plurality of engaging projections 521 that are engaged with the spline projections 412a of the pinion gear shaft 4. The main clutch 5 is one example of a multi-plate clutch of the disclosure.

The cam mechanism 6 includes a main cam 61 and a pilot cam 62 arranged in the axial direction, and a plurality of cam balls 63 disposed between the main cam 61 and the pilot cam 62. The main cam 61 has, at its inner peripheral end, a plurality of engaging projections 611 that are engaged with the spline projections 412a of the pinion gear shaft 4. The main cam 61 is axially movable and non-rotatable relative to the pinion gear shaft 4.

The main cam 61 is provided with a cam groove 61a extending in an arc shape along the circumferential direction. The axial depth of the cam groove 61a gradually decreases from a central portion toward an end portion in the circumferential direction. Likewise, the pilot cam 62 is provided with a cam groove 62a extending in an arc shape along the circumferential direction, and the axial depth of the cam groove 62a gradually decreases from a central portion toward an end portion in the circumferential direction. The cam balls 63 can roll in the cam grooves 61a, 62a. By the cam balls 63 rolling in the cam grooves 61a, 62a from the central portions toward the end portions, a cam thrust force is generated. The main cam 61 presses the main clutch 5 in the axial direction by this cam thrust force. Then, a friction force is generated between the main outer clutch plates 51 and the main inner clutch plates 52 such that the driving force is transmitted from the clutch housing 3 to the pinion gear shaft 4 by this friction force.

The axial movement of the pilot cam 62 toward the vehicle rear side is restricted by a thrust roller bearing 93 disposed between the pilot cam 62 and the inner magnetic member 34. A plurality of spline projections 62b extending in the axial direction are provided on the outer peripheral surface of the pilot cam 62. The cam mechanism 6 is operated by torque that is transmitted from the spline projections 62b to the pilot cam 62 by the electromagnetic clutch mechanism 7.

The electromagnetic clutch mechanism 7 includes a plurality of pilot outer clutch plates 71 and a plurality of pilot inner clutch plates 72 that are disposed alternately in the axial direction, an electromagnetic coil 73, an armature 74 that is moved in the axial direction by a magnetic force of the electromagnetic coil 73, and a yoke 75. Each of the pilot outer clutch plates 71 includes, at its outer peripheral end, a plurality of engaging projections 711 that are engaged with the spline projections 311a of the housing body 31. Each of the pilot inner clutch plates 72 includes, at its inner peripheral end, a plurality of engaging projections 721 that are engaged with the spline projections 62b of the pilot cam 62.

Each of the pilot outer clutch plates 71 and the pilot inner clutch plates 72 is made of a soft magnetic metal such as iron, and disposed between the outer magnetic member 32 and the inner magnetic member 34, and the armature 74. Each of the pilot outer clutch plates 71 and the pilot inner clutch plates 72 is provided with a plurality of arc-shaped slits at positions axially aligned with the non-magnetic ring 33 in order to prevent short-circuiting of magnetic flux. The armature 74 includes, at its outer peripheral end, a plurality of engaging projections 741 that are engaged with the spline projections 311a of the housing body 31.

When the electromagnetic coil 73 is energized, the armature 74 is moved in the axial direction by a magnetic force of the electromagnetic coil 73, and thus, the pilot outer clutch plates 71 and the pilot inner clutch plates 72 are sandwiched between the outer magnetic member 32 and the inner magnetic member 34, and the armature 74 so as to be in frictional contact with each other. Consequently, a rotational force of the clutch housing 3 is partially transmitted to the pilot cam 62 as torque that rotates the pilot cam 62 relative to the main cam 61.

The electromagnetic coil 73 is held by a holder 731 made of a resin and is supported on the yoke 75 made of a soft magnetic metal. The yoke 75 is fixed to the differential carrier 2 by bolts 751. A connector pin 732 is held by the holder 731, and an excitation current is supplied from the control device C to the electromagnetic coil 73 via the connector pin 732.

A support structure for the clutch housing 3 will be described. The clutch housing 3 is supported on the pinion gear shaft 4 via a vehicle front side (propeller shaft 17-side) bearing 94 disposed between the bearing fitting portion 313 of the housing body 31 and the boss portion 411 of the pinion gear shaft 4 and is supported by the differential carrier 2 via a vehicle rear side (gear portion 42-side) bearing 95 disposed between the bearing fitting portion 341 of the inner magnetic member 34 and the bearing fitting portion 221 of the differential carrier 2.

In this embodiment, the vehicle front side bearing 94 and the vehicle rear side bearing 95 are ball bearings, but the vehicle front side bearing 94 and the vehicle rear side bearing 95 are not limited to ball bearings. The vehicle front side bearing 94 and the vehicle rear side bearing 95 may be, for example, needle roller bearings. Further, sliding bearings (i.e., plain bearings) may be used instead of rolling bearings. Hereinafter, the vehicle front side bearing 94 will be referred to as the front bearing 94, and the vehicle rear side bearing 95 will be referred to as the rear bearing 95.

The front bearing 94 includes an outer ring 941 fitted to the inner periphery of the bearing fitting portion 313 of the housing body 31, an inner ring 942 fitted to the outer periphery of the boss portion 411 of the pinion gear shaft 4, and a plurality of balls 943 disposed between the outer ring 941 and the inner ring 942. The movement of the outer ring 941 toward the vehicle rear side is restricted by a washer 853 fitted in the bearing fitting portion 313 of the housing body 31, via a pair of disc springs 851, 852. The movement of the inner ring 942 toward the vehicle front side is restricted by a snap ring 86 fitted to the boss portion 411. A disc-shaped cap 87 is attached to the housing body 31 to cover the front side of the front bearing 94 in the vehicle front-rear direction.

The rear bearing 95 includes an outer ring 951 fitted to the inner periphery of the bearing fitting portion 221 of the differential carrier 2, an inner ring 952 fitted to the outer periphery of the bearing fitting portion 341 of the inner magnetic member 34, and a plurality of balls 953 disposed between the outer ring 951 and the inner ring 952. The outer ring 951 is fitted to an inner peripheral surface 221a of the bearing fitting portion 221, and the movement of the outer ring 951 toward the vehicle rear side is restricted by an end face 221b of the bearing fitting portion 221, the end face 221b facing toward the vehicle front side. The inner ring 952 is fitted to an outer peripheral surface 341a of the bearing fitting portion 341, and the movement of the inner ring 952 toward the vehicle front side is restricted by an end face 341b of the bearing fitting portion 341, the end face 341b facing toward the vehicle rear side. A sealing member 88 is attached to the differential carrier 2. The sealing member 88 is disposed rearward of the rear bearing 95 in the vehicle front-rear direction.

An annular groove 310 is formed in an outer peripheral surface 311b of the cylindrical portion 311 of the housing body 31 so as to extend over the entire outer peripheral surface 311b in its circumferential direction. FIG. 4 illustrates a cross section of the housing body 31, the cross section including the annular groove 310. In FIG. 4, illustration of the respective members disposed in the housing body 31 is omitted.

The bolts 80 are fixed to the first housing portion 21 of the differential carrier 2. Specifically, the bolts 80 are respectively screwed into threaded holes 210 formed to extend through the first housing portion 21 in the radial direction. Each of the bolts 80 includes a head portion 801, a threaded portion 802 screwed into the threaded hole 210, and a columnar pin portion 803. The head portion 801 is disposed outside the first housing portion 21, and the pin portion 803 is disposed inside the first housing portion 21.

A distal end portion 803a (see FIG. 3B) of the pin portion 803 is fitted to the annular groove 310. The width of the annular groove 310 is greater than the diameter of the distal end portion 803a, and each of both side surfaces 310a, 310b of the annular groove 310 does not come in contact with the pin portion 803 during the normal rotation. The depth of the annular groove 310 is greater than a fitting depth $D_2$ of the pin portion 803 (i.e., a depth $D_2$ by which the pin portion 803 is fitted in the annular groove 310), and a bottom surface 310c of the annular groove 310 does not come in contact with the pin portion 803. The fitting depth $D_2$ of the pin portion 803 is greater than the dimension $D_1$ of the slight gap S and is, for example, 2 mm.

As illustrated in FIG. 4, in this embodiment, the three bolts 80 are disposed at regular intervals (120 degrees) in the circumferential direction. However, the number of the bolts 80 is not limited and may be, for example, two or four or more.

When, for example, the four-wheel drive vehicle 1 is traveling on a bad road, there are cases where the propeller shaft 17 collides with an obstacle such as a stone. If the propeller shaft 17 is broken due to this collision such that portions around the broken portion fall off (come off), there is a possibility of the occurrence of further damage to a floor panel of the vehicle body 100, various pipes, wiring harnesses, or the like.

In this embodiment, when an impact occurs on the propeller shaft 17, the pinion gear shaft 4 is broken at the weakened portion 40 due to the impact, thereby restraining breakage of the propeller shaft 17. Further, in this embodiment, in order to prevent the clutch housing 3 from falling off (i.e., coming off) the differential carrier 2 even when the pinion gear shaft 4 is broken at the weakened portion 40, the clutch housing 3 is prevented from falling off (i.e., coming off) by the bolts 80.

That is, in this embodiment, when the pinion gear shaft 4 is broken at the weakened portion 40, the rotation of the clutch housing 3 is allowed while the clutch housing 3 is restrained from falling off the first housing portion 21 of the differential carrier 2 by the plurality of bolts 80. More specifically, the movement of the clutch housing 3 in the direction in which the clutch housing 3 falls off the first housing portion 21 of the differential carrier 2 is restricted by the contact of the side surface 310a of the annular groove 310 with the pin portions 803 of the bolts 80. The side surface 310a is one of the both side surfaces 310a, 310b of the annular groove 310, and the side surface 310a is located rearward of the side surface 310b in the vehicle front-rear direction.

When the pinion gear shaft 4 is broken at the weakened portion 40, the radial movement of the clutch housing 3 is restricted at a plurality of positions relative to the differential carrier 2 or a part of the pinion gear shaft 4, the part of the pinion gear shaft 4 being closer to the gear portion 42 than the weakened portion 40 is. Thus, runout of the clutch housing 3 is prevented. Specifically, when the pinion gear shaft 4 is broken at the weakened portion 40, the clutch housing 3 is supported relative to the differential carrier 2 by the rear bearing 95, and the facing surface 34a of the inner magnetic member 34 comes in contact with the outer peripheral surface 41a of the pinion gear shaft 4 such that the radial movement of the clutch housing 3 relative to the pinion gear shaft 4 is restricted.

A bearing such as a needle roller bearing or a sliding bearing (i.e., a plain bearing) may be disposed between the clutch housing 3 and the medium-diameter portion 413 of the pinion gear shaft 4. In this case, when the pinion gear shaft 4 is broken at the weakened portion 40, the clutch housing 3 is supported relative to the pinion gear shaft 4 by this bearing. Further, instead of the rear bearing 95, the radial movement of the clutch housing 3 relative to the differential carrier 2 may be restricted by a facing surface of the clutch housing 3 facing the differential carrier 2 with a slight gap therebetween.

Further, when the pinion gear shaft 4 is broken at the weakened portion 40, the radial movement of the clutch housing 3 may be restricted at a plurality of positions relative to the differential carrier 2, thereby preventing runout of the clutch housing 3, and the radial movement of the clutch housing 3 may be restricted at a plurality of positions relative to a part of the pinion gear shaft 4 thereby preventing runout of the clutch housing 3, the part of the pinion gear shaft 4 being located closer to the gear portion 42 than the weakened portion 40 is.

Effects of the embodiment will be described. According to this embodiment described above, while reducing the cost by simplifying the configuration such that the first housing portion 21 of the differential carrier 2 has a bottomless cylindrical shape that is open toward the vehicle front side, it is possible to prevent the clutch housing 3 from falling off the differential carrier 2 when the pinion gear shaft 4 is broken at the weakened portion 40. Consequently, until a driver stops the four-wheel drive vehicle 1 in a safe place, it is possible to prevent the occurrence of further damage to a floor panel, various pipes, wiring harnesses, or the like. The driver can notice an abnormality by a strange noise that occurs at the time of breakage of the pinion gear shaft 4, or a strange noise that occurs when the clutch housing 3 rotates while being supported by the bolts 80.

Further, since the position where the radial movement of the clutch housing 3 is restricted by the rear bearing 95, and the position where the radial movement of the clutch housing 3 is restricted by the contact of the facing surface 34a of the inner magnetic member 34 with the outer peripheral surface 41a of the pinion gear shaft 4 are spaced apart from each other in the axial direction, it is possible to more reliably restrain rotational runout of the clutch housing 3 that occurs when the clutch housing 3 rotates in the state where the pinion gear shaft 4 is broken.

While the disclosure has been described with reference to the embodiment, the embodiment is not intended to limit the disclosure.

Further, the disclosure can be carried out with modifications as appropriate within the scope of the disclosure. For example, in the embodiment described above, the driving force transmission device 19 is disposed rearward of the propeller shaft 17 in the vehicle front-rear direction, but the disclosure is not limited to this configuration. Alternatively, the driving force transmission device 19 may be disposed forward of the propeller shaft 17 in the vehicle front-rear direction. In this case, the first housing portion 21 of the differential carrier 2 is open toward the vehicle rear side.

What is claimed is:

1. A driving force transmission device comprising:
    a clutch housing configured to be connected to a propeller shaft;
    a shaft including a weakened portion that is a portion in an axial direction of the shaft;
    a multi-plate clutch disposed between the clutch housing and the shaft;
    a case member including a housing portion having a cylindrical shape, the housing portion being configured to house at least a part of the clutch housing; and
    a falling-off preventing member configured to be separated from the clutch housing when the shaft is whole and, when the shaft is broken at the weakened portion, allow rotation of the clutch housing while restraining the clutch housing from falling off the housing portion by the falling-off preventing member contacting an outer peripheral surface of the clutch housing.

2. The driving force transmission device according to claim 1, wherein the falling-off preventing member is fixed to the housing portion, and a movement of the clutch housing in a direction in which the clutch housing falls off the housing portion is restricted by contact of the clutch housing with the falling-off preventing member.

3. The driving force transmission device according to claim 1, wherein when the shaft is broken at the weakened portion, a radial movement of the clutch housing is restricted at a plurality of positions relative to the case member or the shaft to prevent runout of the clutch housing.

4. The driving force transmission device according to claim 3, wherein when the shaft is broken at the weakened portion, the clutch housing is supported relative to the case member by a rolling bearing.

5. The driving force transmission device according to claim 3, wherein:
the clutch housing has a facing surface that faces an outer peripheral surface of the shaft such that a slight gap is provided between the facing surface and the outer peripheral surface of the shaft; and
when the shaft is broken at the weakened portion, the facing surface comes in contact with the outer peripheral surface of the shaft to restrict the radial movement of the clutch housing relative to the shaft.

6. A driving force transmission device comprising:
a clutch housing configured to be connected to a propeller shaft;
a shaft including a weakened portion that is a portion in an axial direction of the shaft;
a multi-plate clutch disposed between the clutch housing and the shaft;
a case member including a housing portion having a cylindrical shape, the housing portion being configured to house at least a part of the clutch housing; and
a falling-off preventing member configured to, when the shaft is broken at the weakened portion, allow rotation of the clutch housing while restraining the clutch housing from falling off the housing portion,
wherein an annular groove is provided in an outer peripheral surface of the clutch housing, and a distal end portion of the falling-off preventing member is fitted to the annular groove.

* * * * *